United States Patent
Wu et al.

(10) Patent No.: US 11,663,436 B2
(45) Date of Patent: May 30, 2023

(54) BASIC INSULATING PLUG AND ELECTRIC SYSTEM

(71) Applicant: ABB Schweiz AG, Baden (CH)

(72) Inventors: Fumei Wu, Beijing (CN); Yibo Zhang, Beijing (CN); Qing Yang, Beijing (CN)

(73) Assignee: ABB SCHWEIZ AG, Baden (CH)

( * ) Notice: Subject to any disclaimer, the term of this patent is extended or adjusted under 35 U.S.C. 154(b) by 172 days.

(21) Appl. No.: 17/148,733

(22) Filed: Jan. 14, 2021

(65) Prior Publication Data

US 2021/0142137 A1 May 13, 2021

Related U.S. Application Data

(63) Continuation of application No. PCT/CN2018/114910, filed on Nov. 9, 2018.

(51) Int. Cl.
*G06K 19/07* (2006.01)
*G01K 1/024* (2021.01)
(Continued)

(52) U.S. Cl.
CPC ......... *G06K 19/0709* (2013.01); *G01K 1/024* (2013.01); *G01K 1/14* (2013.01);
(Continued)

(58) Field of Classification Search
CPC ......... G06K 19/0709; G06K 19/07773; G01K 1/024; G01K 1/14; H01B 3/30; H01B 19/00
(Continued)

(56) References Cited

U.S. PATENT DOCUMENTS

| 2010/0080554 A1* | 4/2010 | Aguren | H04B 10/073 398/20 |
| 2011/0077884 A1* | 3/2011 | Bowman | H01R 24/42 702/66 |
| 2012/0268290 A1* | 10/2012 | Huang | G01K 1/024 340/870.02 |

(Continued)

FOREIGN PATENT DOCUMENTS

| CN | 106207940 A | 12/2016 |
| CN | 106482845 A | 3/2017 |

(Continued)

OTHER PUBLICATIONS

Intellectrual Property Office of the P.R. China, International Search Report & Written Opinion issued in corresponding Application No. PCT/CN2018/114910, dated Jul. 25, 2019, 10 pp.

(Continued)

*Primary Examiner* — Michael G Lee
*Assistant Examiner* — David Tardif
(74) *Attorney, Agent, or Firm* — Greenberg Traurig, LLP (57) ABSTRACT

A basic insulating plug and an electric system. The basic insulating plug includes an insulating housing, a first conductor, a first RFID tag and insulating filler. The first conductor includes a first end arranged in the insulating housing. The first RFID tag is located at an end surface of the first end or on a lateral side of the first conductor. The first RFID includes a temperature sensor configured to measure a temperature of the first conductor, an integrated circuit coupled to the temperature sensor and configured to receive a signal indicative of the temperature from the temperature sensor, and an antenna coupled to the IC and configured to transmit temperature data based on the signal and receive electric power for powering the RFID tag. The insulating filler is adapted to fix the first RFID to the first (Continued)

conductor by filling a void between the first conductor and an internal surface of the insulating housing.

16 Claims, 4 Drawing Sheets

(51) Int. Cl.
  *G01K 1/14* (2021.01)
  *G06K 19/077* (2006.01)
  *H01B 3/30* (2006.01)
  *H01B 19/00* (2006.01)
(52) U.S. Cl.
  CPC ......... *G06K 19/07773* (2013.01); *H01B 3/30* (2013.01); *H01B 19/00* (2013.01)
(58) Field of Classification Search
  USPC ........................................................ 235/492
  See application file for complete search history.

(56) References Cited

U.S. PATENT DOCUMENTS

| 2019/0250044 | A1* | 8/2019 | Chiu | H04W 4/38 |
| 2021/0142137 | A1* | 5/2021 | Wu | G06K 19/0709 |
| 2021/0356328 | A1* | 11/2021 | Ferraro | G01M 99/002 |

FOREIGN PATENT DOCUMENTS

| CN | 106876866 A | 6/2017 |
| CN | 207440812 U | 6/2018 |
| CN | 208012770 U | 10/2018 |

OTHER PUBLICATIONS

Canada Examination Report; Issued by the Canadian Intellectual Property Office; regarding corresponding patent application Serial No. CA 3106395; dated Oct. 20, 2022, 4 pages.

\* cited by examiner

BASIC INSULATING PLUG AND ELECTRIC SYSTEM

TECHNICAL FIELD

Example embodiments of the present disclosure generally relate to temperature measurement and more particularly, to a basic insulating plug (BIP), an electrical system including the BIP.

BACKGROUND

A BIP is an insulated device that is used to plug into cable connection devices, such as T-body cable connection devices, for connecting cables in the cable connection devices and insulating exposed terminals of the cable connection devices, and the BIP is widely used in the electrical devices such as switchgear or a transformer. Generally, BIPs may be made of various materials, such as resin as well as other materials, depending on individual requirement.

The design of BIP must ensure that the electrical strength of the insulated material is able to withstand the penetrating electrical energy passing through the conductors. Since the voltage passing through the BIP is high and the temperature of the BIP may be also high, it is necessary to monitor the operation status of the cable connection device and BIP so as to ensure safety and power quality of the electrical device (such as switchgear) in which the BIP is used.

Traditionally, a wired thermal couple is used to measure a temperature of the conductor in the cable connection device and BIP, which is very inconvenient. Moreover, traditional ways cannot obtain the accurate temperature of the conductor in the cable connection device and BIP, and it is very costly to measure the temperature in traditional ways. Accordingly, traditional ways for measuring the temperature of the BIP are inaccurate and inefficient. CN106876866A describes an approach for monitoring the temperature of a device in an electrical system. However, this approach requires additional components, such as screws, for fixing a RFID tag to a conductor, which is inconvenient for mounting, and the temperature monitoring may become inaccurate due to loosening of the screws when fixing the device into the electrical system.

SUMMARY

Example embodiments of the present disclosure propose a solution for circuit monitoring.

In a first aspect, example embodiments of the present disclosure provide a BIP. The BIP comprise an insulating housing, a first conductor, a first RFID tag and insulating filler. The first conductor comprises a first end arranged in the insulating housing. The first RFID tag is located at an end surface of the first end or on a lateral side of the first conductor. The first RFID comprises a temperature sensor configured to measure a temperature of the first conductor, an integrated circuit coupled to the temperature sensor and configured to receive a signal indicative of the temperature from the temperature sensor, and an antenna coupled to the IC and configured to transmit temperature data based on the signal and receive electric power for powering the RFID tag. The insulating filler is adapted to fix the first RFID to the first conductor by filling a void between the first conductor and an internal surface of the insulating housing.

In some embodiments, the first conductor comprises an opening for receiving a second conductor at a second end that is opposite to the first end.

In some embodiments, the BIP comprises a third conductor and an insulating cap. The third conductor comprises a first end in the insulating housing insulating from the first end of the first conductor and a second end outside of the insulating housing. The insulating cap is operable to cover the second end of the third conductor.

In some embodiments, the insulating filler is further adapted to fill a void between the third conductor and the internal surface of the insulating housing, and a void between the first conductor and the third conductor.

In some embodiments, the insulating filler comprises thermoset resin or thermoplastic resin.

In some embodiments, the thermoset resin is selected from a group of epoxy, polyurethane, silicone rubber, and combination thereof.

In some embodiments, the temperature sensor is directly attached to the first conductor, or the temperature sensor is attached to the first conductor by a thermally conductive material.

In some embodiments, the temperature sensor is attached to the first conductor by an electrically conductive material surrounding surface of the first conductor.

In some embodiments, the first conductor comprises a groove at the end surface or the lateral side of the first conductor, and the first RFID is located in the groove.

In some embodiments, the third conductor comprises a first groove on a lateral side of the third conductor, and the insulating cap comprises a bump on an internal surface of the insulating cap and operable to fit into the first groove.

In some embodiments, the third conductor comprises a second groove on the lateral side of the third conductor inside the insulating housing.

In some embodiments, the BIP further comprise a second radio frequency identification (RFID) tag located at the end surface of the first end or on the lateral side of the first conductor.

In a second aspect, example embodiments of the present disclosure provide an electric system. The electric system comprises a basic insulating plug of the first aspect, a first antenna; and a reader coupled to the first antenna, wherein the reader is configured to provide wireless radio frequency energy to power the RF tag in the basic insulating plug and receiving temperature data via the first antenna.

In some embodiments, the basic insulating plug is configured to fit into a T-body of a switchgear.

In some embodiments, the electric system further comprises a further BIP of the first aspect.

In some embodiments, the electric system further comprises a second antenna coupled to the reader, and configured to match an antenna of the further basic insulating plug.

In a third aspect, example embodiments of the present disclosure provide an Internet of Things (IoT) system. The IoT system comprises a basic insulating plug of the first aspect.

In a fourth aspect, example embodiments of the present disclosure provide a method for manufacturing a basic insulating plug. The method comprises providing an insulating housing; providing a first conductor comprising a first end arranged in the insulating housing; providing a radio frequency identification (RFID) tag located at an end surface of the first end or on a lateral side of the first conductor, and filling a void between the first conductor and an internal surface of the insulating housing with an insulating filler for fixing the RFID. The RFID comprises a temperature sensor configured to measure a temperature of the first conductor, an integrated circuit (IC) coupled to the temperature sensor and configured to receive a signal indicative of the temperature from the temperature sensor, and an antenna coupled to the IC, and configured to transmit temperature data based on the signal and receive electric power for powering the RF tag.

According to the embodiments of the present disclosure, the temperature of the BIP can be measured accurately and effectively, thereby improving the reliability and safety of the BIP and the electrical device such as switchgear in which the BIP is used. Accordingly, temperature measurement for the BIP can conducted appropriately in a cost-effective and efficient way.

BRIEF DESCRIPTION OF THE DRAWINGS

Through the following detailed descriptions with reference to the accompanying drawings, the above and other objectives, features and advantages of the example embodiments disclosed herein will become more comprehensible. In the drawings, several example embodiments disclosed herein will be illustrated in an example and in a non-limiting manner, wherein.

Throughout the drawings, the same or corresponding reference symbols refer to the same or corresponding parts.

DETAILED DESCRIPTION

The subject matter described herein will now be discussed with reference to several example embodiments. These embodiments are discussed only for the purpose of enabling those skilled persons in the art to better understand and thus implement the subject matter described herein, rather than suggesting any limitations on the scope of the subject matter.

The term "comprises" or "includes" and its variants are to be read as open terms that mean "includes, but is not limited to." The term "or" is to be read as "and/or" unless the context clearly indicates otherwise. The term "based on" is to be read as "based at least in part on." The term "being operable to" is to mean a function, an action, a motion or a state can be achieved by an operation induced by a user or an external mechanism. The term "one embodiment" and "an embodiment" are to be read as "at least one embodiment." The term "another embodiment" is to be read as "at least one other embodiment."

Unless specified or limited otherwise, the terms "mounted," "connected," "supported," and "coupled" and variations thereof are used broadly and encompass direct and indirect mountings, connections, supports, and couplings. Furthermore, "connected" and "coupled" are not restricted to physical or mechanical connections or couplings. In the description below, like reference numerals and labels are used to describe the same, similar or corresponding parts in the Figures. Other definitions, explicit and implicit, may be included below.

As mentioned above, temperature of conductors in an electrical device, such as switchgear, need to be monitored so as to ensure safety and power quality of the electrical device.

Figure 1:
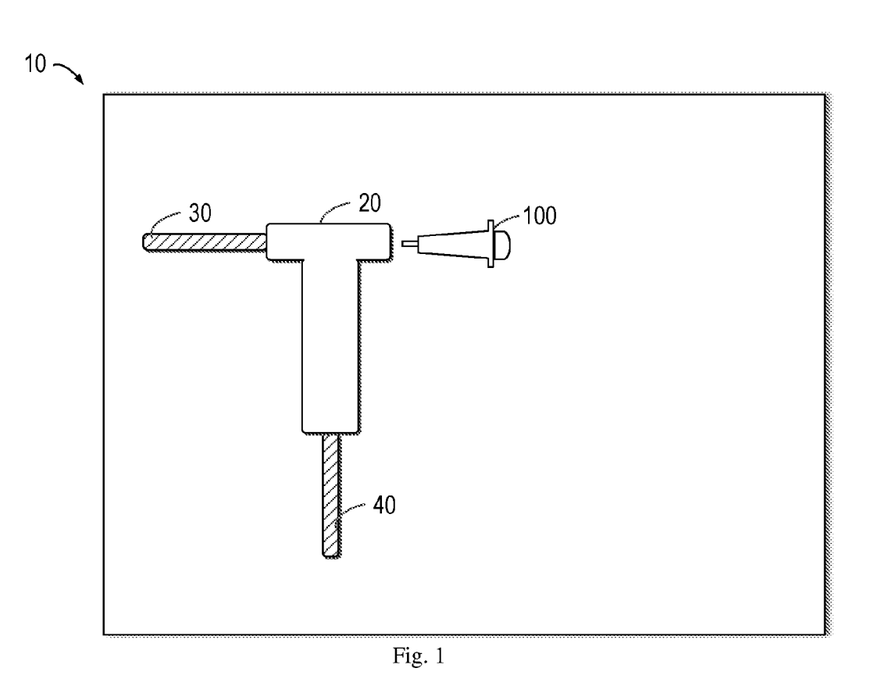
FIG. 1 illustrates a schematic diagram of a switchgear in accordance with some example embodiments of the present disclosure.

FIG. 1 illustrates a schematic diagram of a switchgear 10 in accordance with some example embodiments of the present disclosure. The switchgear 10 includes, among other components, a T-body 20 and a BIP 100. The T-body 20 generally includes three terminals for connection. Cables 30 and 40 can be inserted into first and second terminals of the T-body 20 for connection.

The BIP 100 includes a temperature sensor for sensing temperature of the conductors, and can fit into the third terminal of the T-body 20 to electrically couple the cables 30 and 40 inside the T-body 20. The temperature sensor is contained in RFID tag. The RFID tag is a passive element that requires no wired connection for supplying power. The RFID tag also includes an antenna inside the tag, and electrical power can be supplied to the RFID via the antenna from an electromagnetic generation device, such as a RFID reader. As such, the RFID can be located conveniently at any place as necessary.

Upon fitting into the T-body 20, a part of the BIP 100 including the RFID tag is inserted into the T-body 20, and the rest of the BIP 100 is exposed outside of the T-body 20. The exposed part of the BIP 100 is electrically insulating for safety. The RFID tag including the temperature sensor located inside the T-body 20 can sense real-time temperature of the conductor inside the T-body 20 in response to wirelessly powering the RFID tag. By sensing real-time temperature of the conductor, it can prevent or reduce the failure possibility of cable accessories caused by temperature rising.

Although only one T-body 20 and one BIP 100 are shown in FIG. 1, it could be understood that the switchgear 10 may include a plurality of T-bodies and a plurality of BIPs. Also, it could be understood that the BIP could be used for other cable connection devices, and the numbers of the T-bodies and the BIPs could be different in the switchgear 10.

Figure 2:
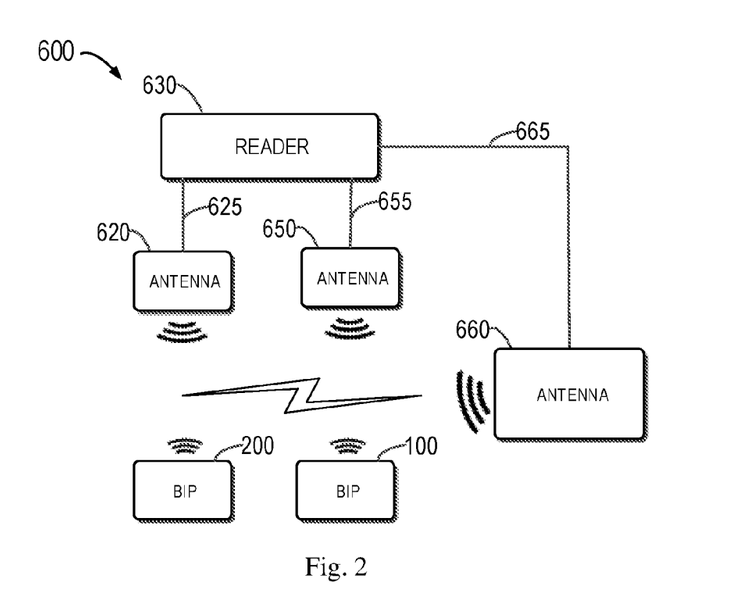
FIG. 2 illustrates an electric system in accordance with some example embodiments of the present disclosure.

FIG. 2 illustrates an electric system 600 in accordance with some example embodiments of the present disclosure. As shown, the system 600 comprises a BIP 100. The BIP 100 comprises a temperature sensor configured to measure a temperature of the conductor and a passive wireless communication module configured to transmit the measured temperature. The system 600 further comprises an antenna 620 and a reader 630 connected to the first antenna 620, and the reader 630 is configured to provide wireless radio frequency energy to power the RFID tag in the BIP 100 via the first antenna 620.

In some embodiments, the BIP 100 may be arranged on a cable accessory cabinet of a switchgear 10, and the antenna 620 may be arranged on a side wall or a top wall of the cable accessory cabinet so that the wireless communication between the BIP 100 and the antenna 620 can be enhanced.

In some embodiments, the system 600 may further comprise a BIP 200, which also may be the BIP 100, 400, 500 as discussed above, and an antenna 650. In some embodiments, the antenna 620 may be arranged towards the BIP 100 while the antenna 650 may be arranged towards the BIP 200. Moreover, the system 600 may further comprise an antenna 660, which may be arranged on a front door of a cable accessory cabinet of the switchgear. The antenna 660 may be a larger antenna and can provide wireless radio frequency energy to power all the temperature sensors in the system 600.

According to embodiments of the present disclosure, the temperature sensors in BIPs 100 and 200 can use the received radio frequency energy to work so as to obtain the temperatures of the BIPs. The antennas 620 and 650 are connected to the reader 630 via the lines 625, 655 such as a RF cable or a co-axially cable and are configured to receive the measured temperatures from the BIP 100 and 200. Moreover, the antenna 660 may be connected to the reader 630 via the line 665. For example, the antenna 660 may be arranged on a front door of a cable accessory cabinet of the switchgear.

For example, the reader 630 may ask all temperature sensors in the BIPs 100, 200 for electronic product codes (EPCs), the temperature sensors in the BIPs 100, 200 return the EPCs to the reader 630 and start to work. Next, the reader 630 starts to obtain temperatures from the temperature sensors of BIPs 100, 200, and each temperature sensor returns the temperature to the reader 630 in real time.

In some embodiments, the reader 630 may be arranged in a low voltage (LV) cabinet of a switchgear, and the size of the reader may be for example 30 mm*80 mm*10 mm. For example, it is ensured that there is no metal element laid between the antennas and the BIP so as not interrupt the wireless communications. Furthermore, to have good communication quality, the antennas and the reader may be tuned so that the power, frequency, direction and so on may be optimal for operations of the temperature sensors in the BIPs.

Figure 6:
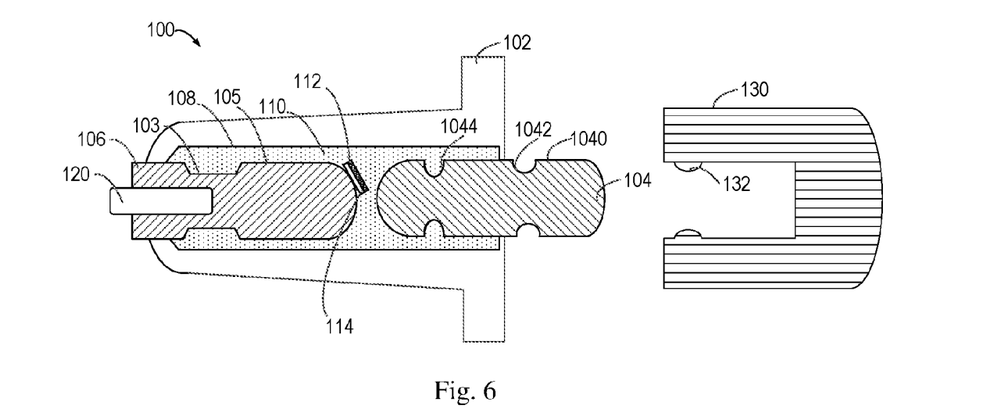
FIG. 6 illustrates a cross section view of a BIP in accordance with some example embodiments of the present disclosure.

It is to be understood that although two BIP 100, 200 are shown in FIG. 6, the system 600 may include less or more BIPs. Moreover, to improve the communication quality in the case of a large amount of temperature sensors, more antennas located at different locations may be provided in the system 600.

In some embodiments, the temperature sensors in the BIP of the present disclosure can be used to measure temperature of the BIP. The temperature sensors in the BIP of the present disclosure can be used to measure temperature of other devices at which the BIP is located and having good thermal communication with the BIP, according to the embodiments of the present disclosure, and thus temperature changes at different locations can be also monitored quickly and accurately.

Conventionally, to measure a temperature of the BIP, a temperature measurement system needs to arrange lots of wires and batteries to work, which is inconvenient and inefficient. To solve this problem, according to emblements of the present disclosure, by use of the BIP according to embodiments of present disclosure, the temperature of the BIP can be measured wirelessly and passively. In this way, the proposed system can provide a convenient and efficient way to measure the temperature of the BIP.

In some embodiments, the electric system 600 may be deployed as an Internet-of-Things (IoT) system. In the system 600, the reader 630 is connected wiredly or wirelessly to a system for on-line monitoring of temperature of conductors, and transmits temperature data collected by the temperature sensors of the BIPs to the system for on-line monitoring.

Figure 3:
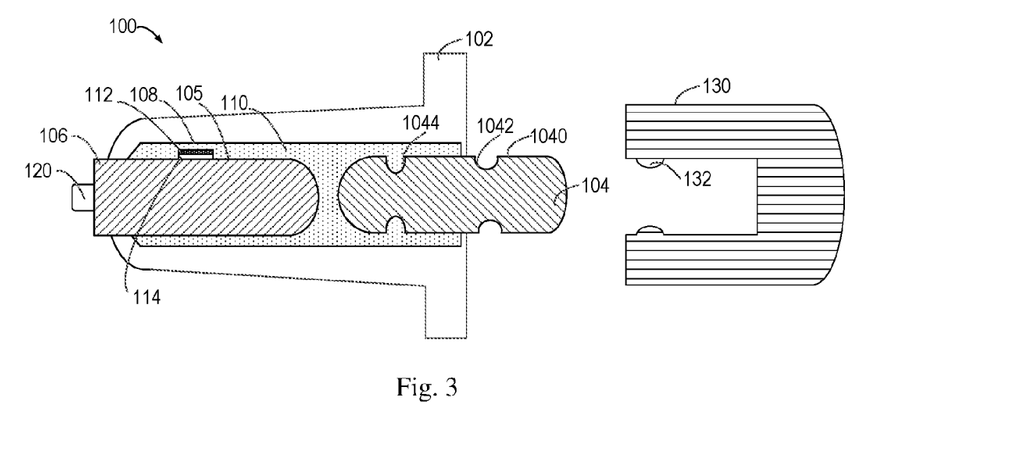
FIG. 3 illustrates a cross section view of a BIP in accordance with some example embodiments of the present disclosure.

FIG. 3 illustrates a cross section view of a BIP 100 in accordance with some example embodiments of the present disclosure. The BIP 100 comprise an insulating housing 102, a first conductor 106, a first RFID tag and insulating filler 110. The housing 102 is made of insulation materials. The first conductor 106 comprises a first end arranged in the insulating housing 102.

The first RFID tag is located on a lateral side 108 of the first conductor 106. The first conductor 106 can be made of copper, aluminum, alloys, or other electrically conductive materials. The first conductor 106 has a generally elongated shape with two ends. One end of the first conductor 106 is located in the housing 102, and the other end of the first conductor 106 may be outside of the housing 102. In another example, the other end of the first conductor 106 may be in the housing 102.

The first RFID comprises a temperature sensor 114 configured to measure a temperature of the first conductor 106, an integrated circuit (IC) and an antenna 112. The IC (not shown) is coupled to the temperature sensor 114 and configured to receive a signal indicative of the temperature from the temperature sensor 114. The IC can be in the same layer of the temperature sensor 114 or the antenna 112. Alternatively, the IC can be sandwiched between the temperature sensor 114 and the antenna 112.

The antenna 112 is coupled to the IC and configured to transmit temperature data based on the signal and receive electric power for powering the RFID tag. Specifically, the IC generates the temperature data according to wireless transmission protocols in response to receiving the signal from the temperature sensor 114, and transmits the temperature data via the antenna 112. By using a RFID tag, the temperature sensing become more convenient and consumes less power, since no power is consumed when the RFID is not energized.

The insulating filler 110 is adapted to fix the first RFID tag to the first conductor 106 by filling a void between the first conductor 106 and an internal surface of the insulating housing 102. The term "filler" refers to a material that is in a form of colloid or liquid and can be solidified by certain physical processing, such as heating or light irradiation. The filler herein may comprise thermoset resin, thermoplastic resin or combinations thereof with a benefit of not affecting signal transmission of the RFID tag. In some embodiments, the thermoset resin is selected from a group of epoxy, polyurethane, silicone rubber, and combination thereof.

By using insulating filler 110, the RFID tag including the temperature sensor 114 can be more reliably attached to the first conductor for sensing more accurate temperature of the first conductor 106 without affecting signal transmission.

As shown, the first RFID tag may be attached to the first conductor 106 at first, and insulating filler 110 may then be injected into the void between the first conductor 106 and the inner surface of the insulating housing 102. After confirming that the first RFID tag is well attached to the first conductor 106, solidification of the filler can be conducted, and the RFID can thus be fixed in the filler 110 and have good thermal communication with the first conductor 106.

Although the insulating filler 110 is shown to fill a void between the first conductor 106 and the inner surface of the housing 102, a void between the third conductor 104 and the internal surface of the insulating housing 102, and a void between the first conductor 106 and the third conductor 104, this is only for illustration without suggesting any limitations as to the scope of the subject matter described here. As an example, the filler 110 can only fill the void between the first conductor 106 and the inner surface of the housing 102, or only cover the part of the first conductor 106 inside the housing 102 and the RFID tag.

The BIP 100 also includes a second conductor 120, a third conductor 104 and an insulating cap 130. The second conductor 120 is fixed and electrically coupled to the first conductor 106. The second conductor 120 is used for electrically coupling the cables 30 and 40 in response to inserting into the T-body 20. Although the first conductor 106 and the second conductor 120 are shown as individual components, they may be formed integrally in an example.

The BIP 100 comprises a third conductor 104 and an insulating cap 130. The third conductor 104 comprises a first end in the insulating housing 102 insulating from the first end of the first conductor 106 and a second end outside of the insulating housing 102. The insulating cap 130 is operable to cover the second end of the third conductor 104, and is used to insulating the BIP for accidental electric shock or electrical breakdown.

The third conductor 104 may include a first groove 1042 and a second groove 1044 on the lateral side. The first groove 1042 is configured to match a bump 132 on the inner surface of the cap 130, such that the cap 130 can be fixed to the third conductor 104 in response to the bump 132 sliding into the first groove 1042. The second groove 1044 is configured to provide a coarse lateral surface such that the third conductor 104 will not slide out of the housing 102 after the filler 110 is solidified. Although a second groove 1044 is shown, it is to be understood that other coarse surface structure can be applied, as long as the third conductor 104 will not slide out of the housing 102 easily after the filler 110 is solidified.

Figure 4:
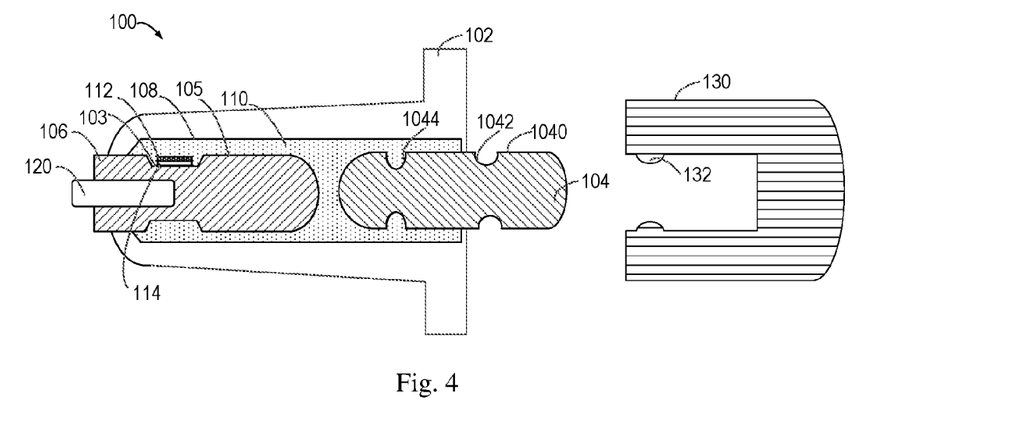
FIG. 4 illustrates a cross section view of a BIP in accordance with some example embodiments of the present disclosure.

FIG. 4 illustrates a cross section view of a BIP 100 in accordance with some example embodiments of the present disclosure. The structure of the BIP is similar to the structure shown in FIG. 3 except for the structure of the first conductor 106. The first conductor 106 in FIG. 4 includes a groove 103 on the lateral side of the first conductor 106 and an opening at a second end that is opposite to the first end.

The opening is configured to receive the second conductor 120 at the second end such that the second conductor 120 can be fixed to and electrically coupled to the first conductor 106. For example, the inner surface of the opening and the lateral surface of the second conductor 120 may have matching screw threads. The size of the groove 103 is designed to accommodate the RFID tag. This is beneficial, because the RFID tag can be fit into the groove 103 without help from glues or fixing mechanisms before filling the filler 110. After the filler 110 is filled and solidified, the RFID tag can be fixed to and in well thermal communication with the first conductor 106.

Figure 5:
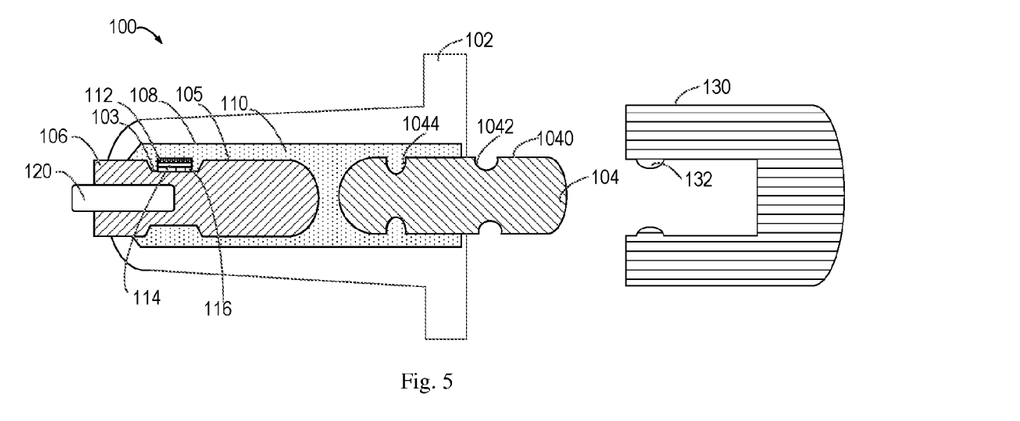
FIG. 5 illustrates a cross section view of a BIP in accordance with some example embodiments of the present disclosure.

FIG. 5 illustrates a cross section view of a BIP 100 in accordance with some example embodiments of the present disclosure. The structure of the BIP 100 is similar to the structure shown in FIG. 4 except for the attaching of the RFID tag to the first conductor 106. The temperature sensor 114 of the RFID tag in FIG. 3 is directly attached to the first conductor. In FIG. 4, the temperature sensor 114 of the RFID tag is attached to the first conductor by a thermally conductive material 116. By using a thermally conductive material 116, the temperature sensor of the RFID tag can sense temperature of the first conductor 106 more accurately.

Although the thermally conductive material 116 is shown, this is only for illustration without suggesting any limitations as to the scope of the subject matter described here. For example, an electrically conductive material may be applied to surround surface of the first conductor, and the temperature sensor 114 of the RFID tag can be attached to the electrically conductive material directly. By applying the electrically conductive material, the electric filed surrounding the first conductor 106 can be averaged, and potential electric breakdown can be prevented without scarifying much performance of thermal communication.

FIG. 6 illustrates a cross section view of a BIP 100 in accordance with some example embodiments of the present disclosure. The structure of the BIP 100 is similar to the structure shown in FIG. 5 except for the RFID tag being located at the first end of the first conductor 106 and no thermal conductive material 116.

Figure 7:
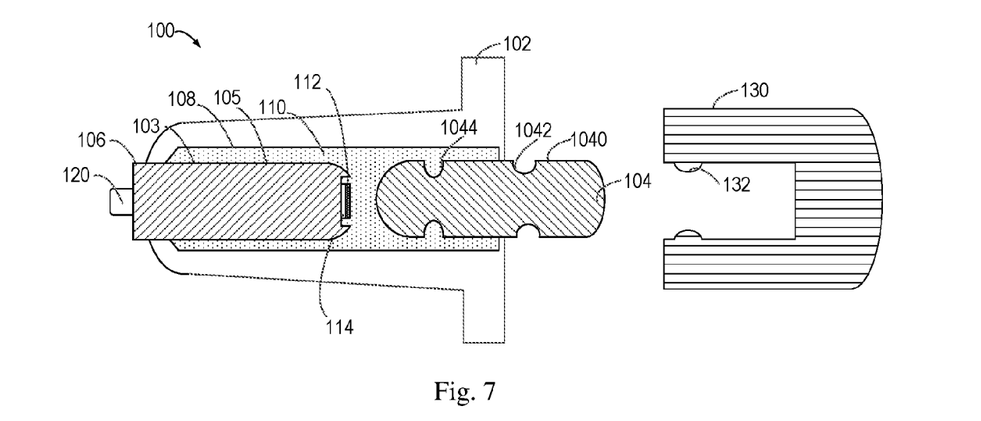
FIG. 7 illustrates a cross section view of a BIP in accordance with some example embodiments of the present disclosure.

FIG. 7 illustrates a cross section view of a BIP 100 in accordance with some example embodiments of the present disclosure. The structure of the BIP 100 is similar to the structure shown in FIG. 6 except for the RFID tag being located in a groove at the first end of the first conductor 106 and no groove at the lateral side of the first conductor 106. Although the lateral side is shown to be smooth, this is for illustration without suggesting any limitations as to the scope of the subject matter described here. In an example, the lateral side of the first conductor 106 can be configured to be coarse to prevent the first conductor 106 sliding out of the housing 102 easily.

Figure 8:
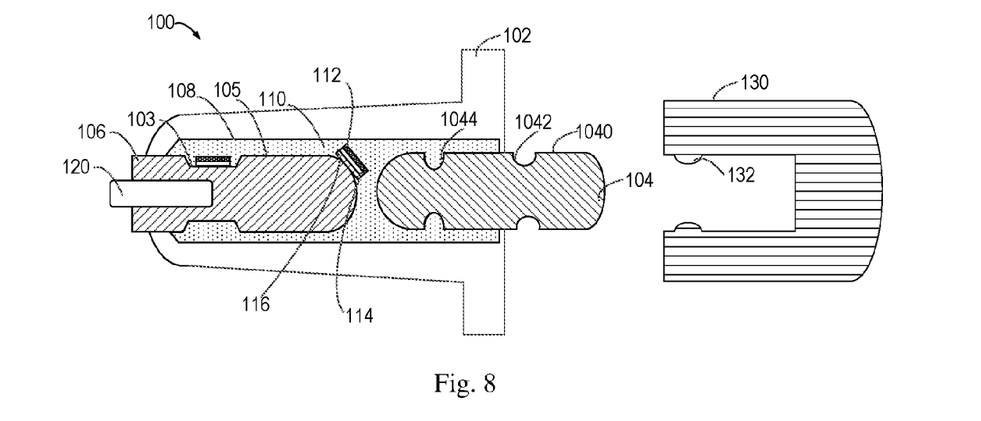
FIG. 8 illustrates a cross section view of a BIP in accordance with some example embodiments of the present disclosure.

FIG. 8 illustrates a cross section view of a BIP 100 in accordance with some example embodiments of the present disclosure. The structure of the BIP 100 is similar to the structure shown in FIG. 6 except for a second RFID tag located in the groove 103 on the lateral side of the first conductor 106. To measure temperature of the first conductor 106 more accurately and effectively, a second RFID tag including a temperature sensor may be attached to the first conductor 106. The second RFID tag may be the same as the first RFID tag.

Although the first RFID tag is shown at the first end of the conductor 106 and the second RFID tag is shown in the groove on the lateral side of the conductor 106, the RFIDs may be located at other places inside the housing 102. For example, the first RFID tag may be located in the groove at the first end, and the second RFID tag may be located on the lateral side. Although two RFID tags are shown in FIG. 8, this is only for illustration without limiting numbers of RFID tags that can be applied in the housing 102. It could be understood that more than two RFID tags are possible for more accurate sensing. Also, it could be understood that the description for the RFID tag of FIGS. 3-7 can be applied to at least one of the RFID tags in FIG. 8, and the features of the structures of FIGS. 3-7 can be combined and arranged as needed in practice.

Figure 9:
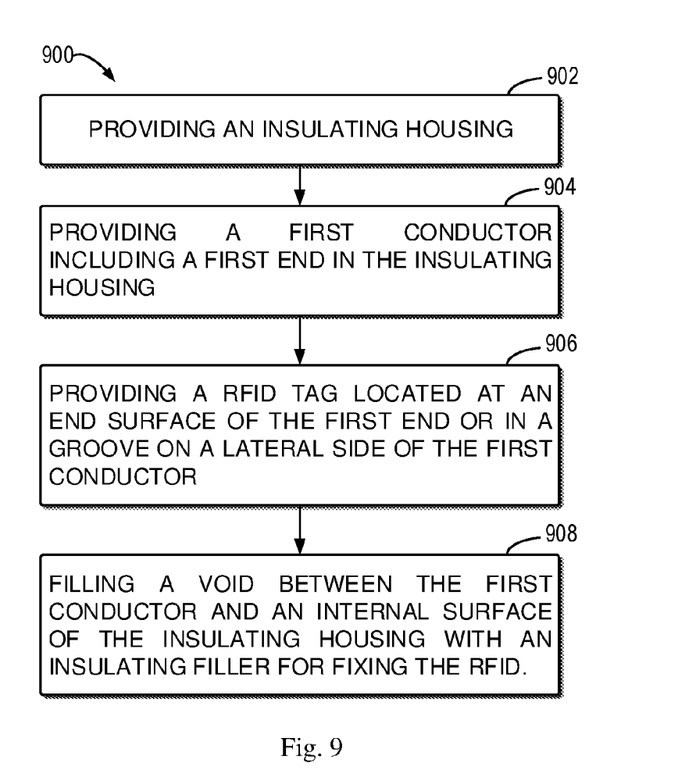
FIG. 9 illustrates a method for manufacturing a BIP in accordance with some example embodiments of the present disclosure.

FIG. 9 illustrates a method 900 for manufacturing a BIP in accordance with some example embodiments of the present disclosure. At 902, an insulating housing is provided. At 904, a first conductor comprising a first end arranged in the insulating housing is provided. At 906, a RFID tag located at an end surface of the first end or on a lateral side of the first conductor is provided. The RFID comprises a temperature sensor configured to measure a temperature of the first conductor, an IC coupled to the temperature sensor and configured to receive a signal indicative of the temperature from the temperature sensor, and an antenna coupled to the IC, and configured to transmit temperature data based on the signal and receive electric power for powering the RF tag. At 908, a void between the first conductor and an internal surface of the insulating housing is filled with an insulating filler for fixing the RFID.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. On the other hand, various features that are described in the context of a single embodiment may also be implemented in multiple embodiments separately or in any suitable subcombination.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A basic insulating plug, comprising:
   an insulating housing;
   a first conductor comprising a first end arranged in the insulating housing;
   a first radio frequency identification (RFID) tag located at an end surface of the first end or on a lateral side of the first conductor, the first RFID tag comprising:
      a temperature sensor configured to measure a temperature of the first conductor,
      an integrated circuit (IC) coupled to the temperature sensor and configured to receive a signal indicative of the temperature from the temperature sensor, and
      an antenna coupled to the IC and configured to transmit temperature data based on the signal and receive electric power for powering the first RFID tag;
   an insulating filler adapted to fix the first RFID tag to the first conductor by filling a void between the first conductor and an internal surface of the insulating housing;
   a third conductor comprising a first end in the insulating housing insulating from the first end of the first conductor and a second end outside of the insulating housing; and
   an insulating cap operable to cover the second end of the third conductor.

2. The basic insulating plug of claim 1, wherein the first conductor comprises an opening for receiving a second conductor at a second end that is opposite to the first end.

3. The basic insulating plug of claim 1, wherein the insulating filler is further adapted to fill a void between the third conductor and the internal surface of the insulating housing, and a void between the first conductor and the third conductor.

4. The basic insulating plug of claim 3, wherein the insulating filler comprises thermoset resin or thermoplastic resin.

5. The basic insulating plug of claim 4, wherein the thermoset resin is selected from a group of epoxy, polyurethane, silicone rubber, and combination thereof.

6. The basic insulating plug of claim 1, wherein the temperature sensor is directly attached to the first conductor, or the temperature sensor is attached to the first conductor by a thermally conductive material.

7. The basic insulating plug of claim 1, wherein the temperature sensor is attached to the first conductor by an electrically conductive material surrounding surface of the first conductor.

8. The basic insulating plug of claim 1, wherein the first conductor comprises a groove at the end surface or the lateral side of the first conductor, and the first RFID is located in the groove.

9. The basic insulating plug of claim 1, wherein the third conductor comprises a first groove on a lateral side of the third conductor, and the insulating cap comprises a bump on an internal surface of the insulating cap and operable to fit into the first groove.

10. The basic insulating plug of claim 9, wherein the third conductor comprises a second groove on the lateral side of the third conductor inside the insulating housing.

11. The basic insulating plug of claim 1, further comprising a second radio frequency identification (RFID) tag located at the end surface of the first end or on the lateral side of the first conductor.

12. An electric system, comprising:
    the basic insulating plug of claim 1;
    a first antenna; and
    a reader coupled to the first antenna, wherein the reader is configured to provide wireless radio frequency energy to power the RFID tag in the basic insulating plug and receiving temperature data via the first antenna.

13. The electric system according to claim 12, wherein the basic insulating plug is configured to fit into a T-body of a switchgear.

14. The electric system according to claim 12,
    wherein the first conductor comprises an opening for receiving a second conductor at a second end that is opposite to the first end.

15. The electric system according to claim 12, further comprising:
    a second antenna coupled to the reader, and configured to match an antenna of the basic insulating plug.

16. A method for manufacturing a basic insulating plug, comprising:
    providing an insulating housing;
    providing a first conductor comprising a first end arranged in the insulating housing;
    providing a radio frequency identification (RFID) tag located at an end surface of the first end or on a lateral side of the first conductor, the RFID comprising:
       a temperature sensor configured to measure a temperature of the first conductor,
       an integrated circuit (IC) coupled to the temperature sensor and configured to receive a signal indicative of the temperature from the temperature sensor, and
       an antenna coupled to the IC, and configured to transmit temperature data based on the signal and receive electric power for powering the RFID tag;
    filling a void between the first conductor and an internal surface of the insulating housing with an insulating filler for fixing the RFID tag;
    providing a third conductor comprising a first end in the insulating housing insulating from the first end of the first conductor and a second end outside of the insulating housing; and
    providing an insulating cap operable to cover the second end of the third conductor.

* * * * *